(12) United States Patent
Farrell et al.

(10) Patent No.: US 7,016,050 B2
(45) Date of Patent: *Mar. 21, 2006

(54) MICROSCOPE WITH FIXED-ELEMENT AUTOCOLLIMATOR FOR TILT ADJUSTMENT

(75) Inventors: Colin T. Farrell, Green Valley, AZ (US); Der-Shen Wan, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 351 days.

This patent is subject to a terminal disclaimer.

(21) Appl. No.: 10/426,349

(22) Filed: Apr. 30, 2003

(65) Prior Publication Data

US 2004/0218191 A1   Nov. 4, 2004

(51) Int. Cl.
*G01B 9/02* (2006.01)
(52) U.S. Cl. .................................. 356/510
(58) Field of Classification Search ........... 356/508, 356/510, 511, 512, 513; 359/370, 371
See application file for complete search history.

(56) References Cited

U.S. PATENT DOCUMENTS

| 5,054,925 A | * | 10/1991 | Hunter ................. 356/508 |
| 5,784,164 A | * | 7/1998 | Deck et al. ........... 250/201.3 |
| 6,677,565 B1 | * | 1/2004 | Wahl et al. ........... 250/201.3 |

* cited by examiner

*Primary Examiner*—Gregory J. Toatley, Jr.
*Assistant Examiner*—Michael A. Lyons
(74) *Attorney, Agent, or Firm*—Antonio R. Durando; Quarles & Brady Streich Lang LLP (57) ABSTRACT

The movable point source aperture used in conventional autocollimators for measuring tilt in a microscope's test sample is replaced by a fixed laser diode. The diode is turned on only for the duration of the tilt measurement, when light is delivered to the optical system of the microscope without obstruction of the normal illumination path. Similarly, the two switchable optical systems conventionally used in the metrology and tilt-measurement legs of the microscope are replaced by two permanently positioned independent imaging systems. Such optical decoupling of the two types of measurement eliminates the need for switching lens systems, which enables shorter measurement cycles, reduces mechanical vibrations, and simplifies hardware control mechanisms.

14 Claims, 8 Drawing Sheets

MICROSCOPE WITH FIXED-ELEMENT AUTOCOLLIMATOR FOR TILT ADJUSTMENT

BACKGROUND OF THE INVENTION

1. Field of the Invention

This invention pertains to the general field of precision optical alignment and, in particular, to a high-speed angular monitoring metrology module with diminished mechanical drift and improved accuracy.

2. Description of the Prior Art

The accuracy and precision of sample metrology with standard optical instrumentation depends among other factors upon reducing measurement aberrations. In particular, the introduction of an angular tilt in a sample under test with respect to the optical axis of an optical metrology system is the most frequent error in sample positioning, which requires proper detection and correction. In automated microscopic systems, where many loose samples are characterized sequentially in trays in an unconstrained position, the implementation of sample tilt correction for high-precision measurements may seriously affect system efficiency and throughput.

The detection of minor sample-tilts in interferometric microscope systems, for example, requires the identification of corresponding changes in orientation of interferometric fringes. These fringes may be used to provide tilt correction on the order of about 10 to 15 wavelengths, depending on camera resolution.

Figure 1:
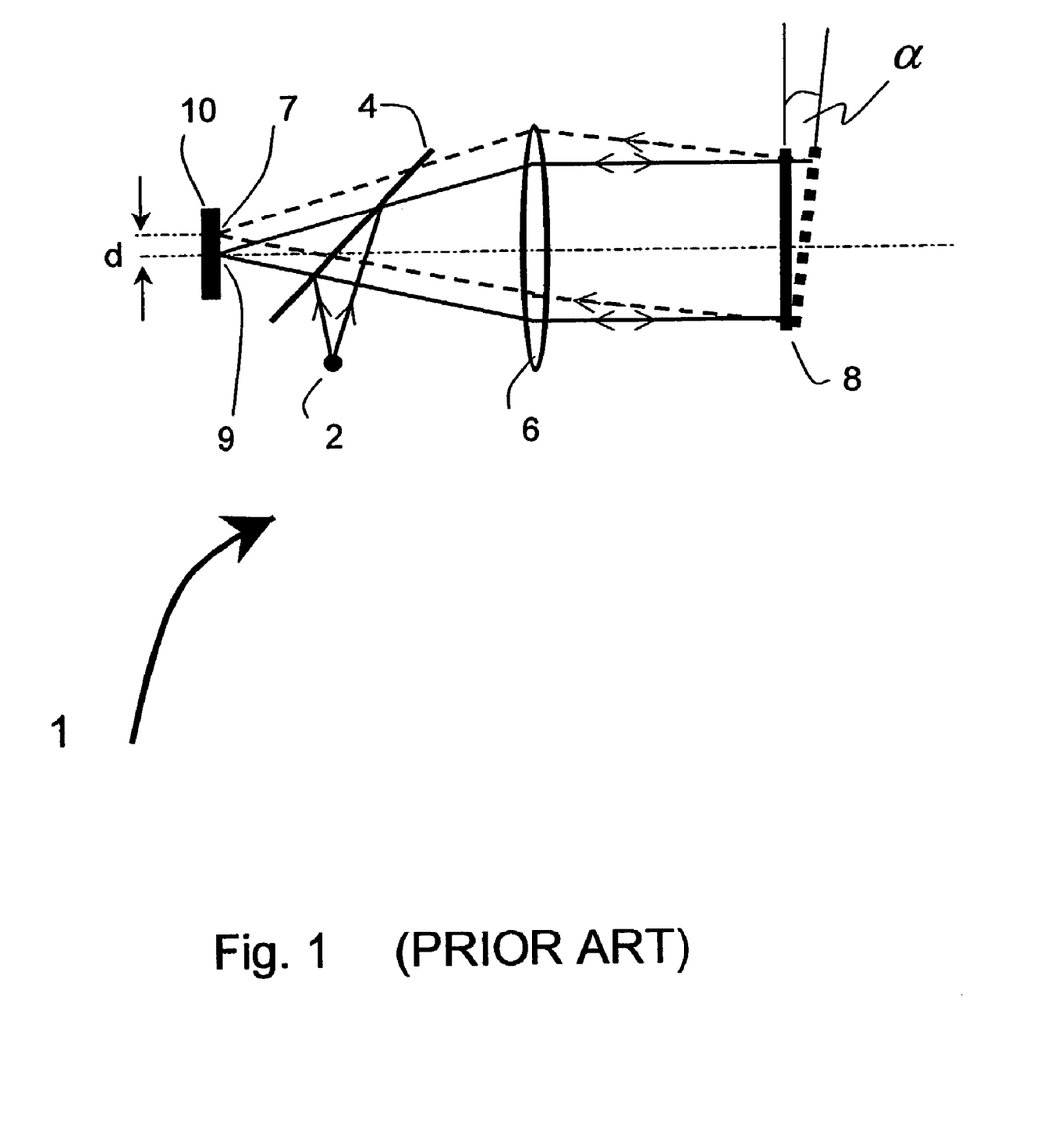
FIG. 1 illustrates a conventional arrangement for tilt measurement of a sample with an autocollimator.

Larger angular sample displacements, on the other hand, may require the use of a basic autocollimator, as shown in FIG. 1. This invention is directed only at a new procedure for correction of such large tilts.

In the implementation of a prior-art autocollimator 1, illustrated in FIG. 1, a beam from a light source 2 is partly reflected by a beamsplitter 4 and collimated by a lens 6 towards the sample 8 under test. The fraction of light reflected by the sample is focused by the lens onto the surface of a position-sensitive detector 10, for example a CCD-camera. When the sample is tilted by an angle $\alpha$, the reflected portion of the beam is focused onto a spot 7 that is displaced from a pre-calibrated null-tilt position 9. The amount of displacement d is indicative of the sample-tilt.

The sample-tilt detection and correction step in existing interferometric microscopes typically precedes the sample characterization step. As illustrated in the microscope system 30 of FIG. 2A, the sample-tilt detection system makes use of a point aperture A by flipping it into the illumination leg 12 of the microscope to provide an effective point source of light under illumination I.

Figure 2A:
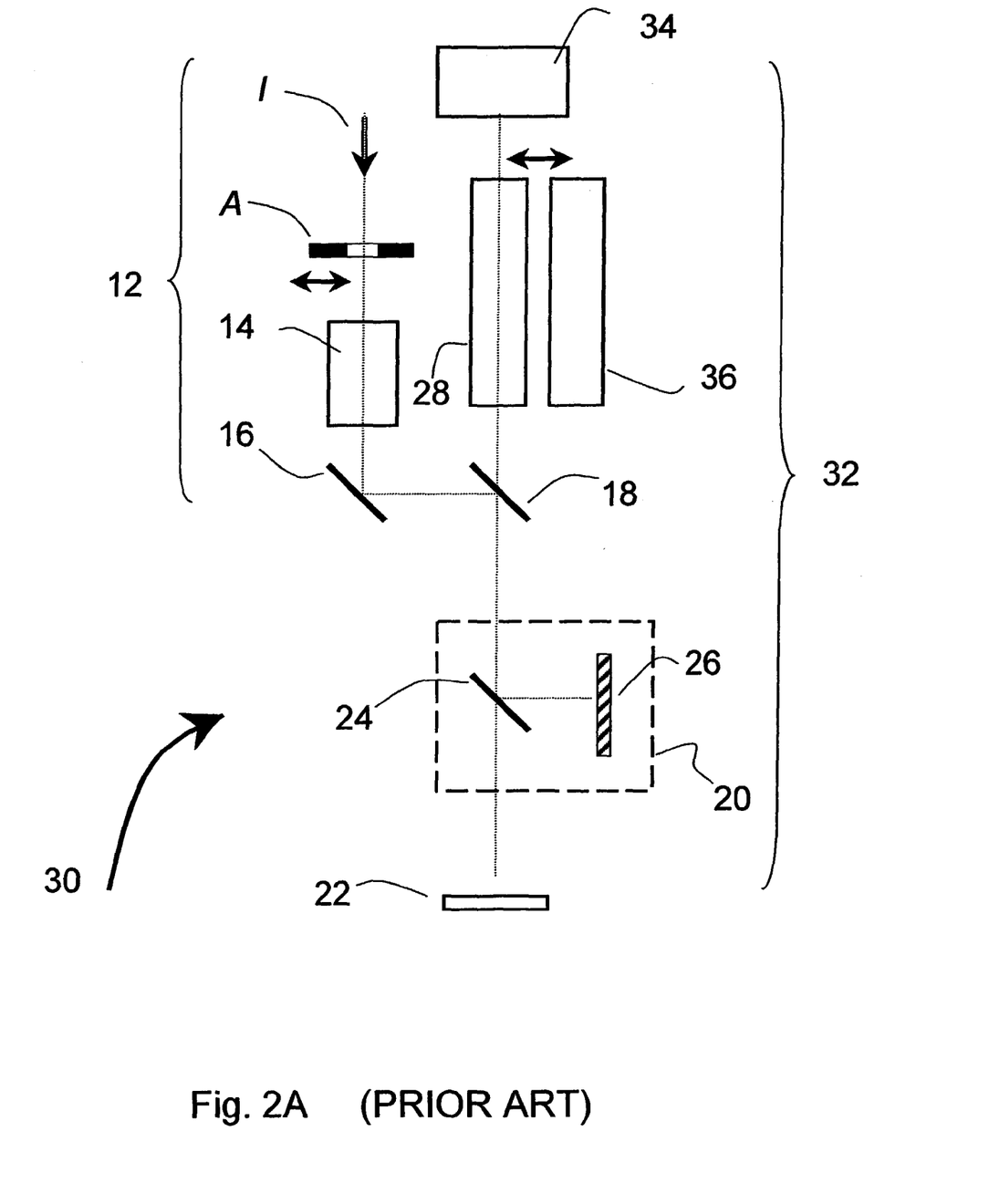
FIG. 2A is a schematic representation of a conventional interferometric microscope configuration for tilt measurement of a sample.

A fraction of the light from this point source is delivered to a test surface 22 as a collimated beam by an optical system 14 of the illumination leg through a mirror 16, a beamsplitter 18 and an interferometric objective 20. Another fraction of light is delivered via a beamsplitter 24 to a reference mirror 26.

Figure 2B:
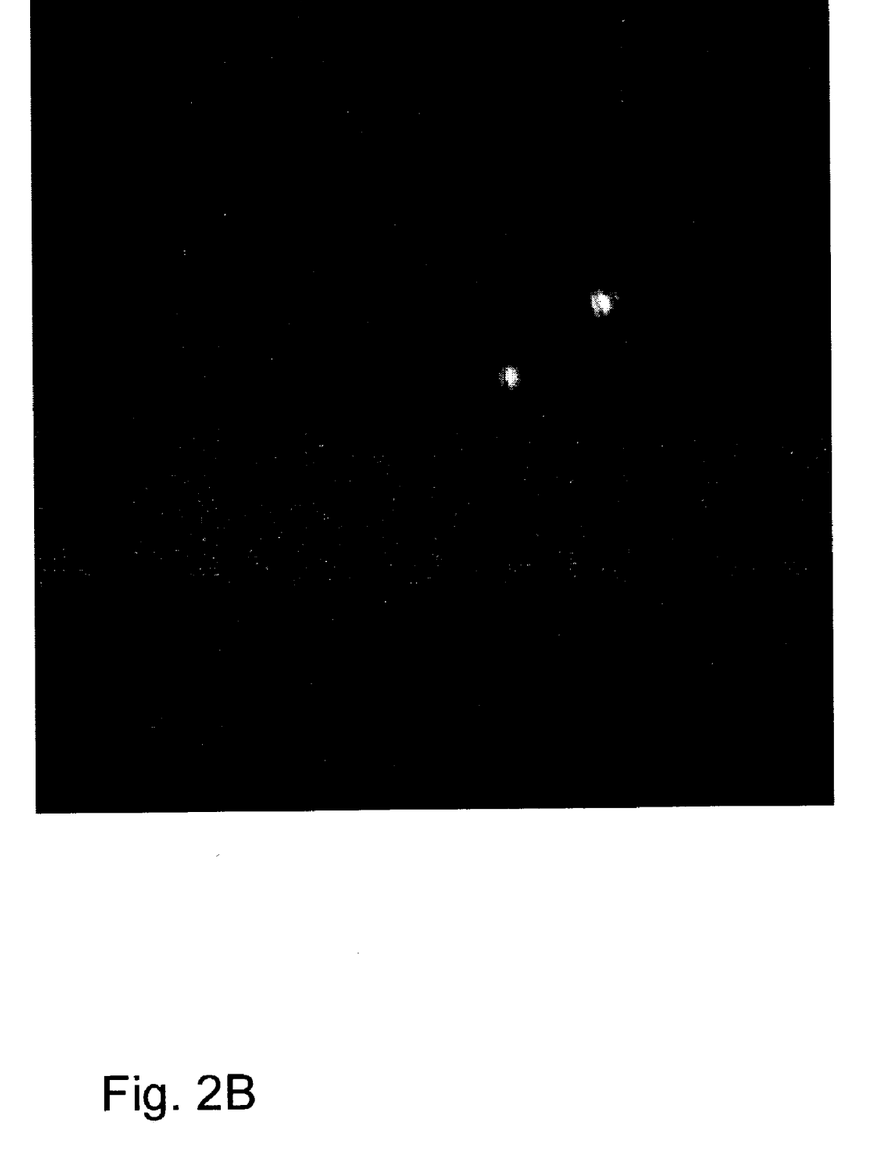
FIG. 2B shows two distinctive image spots at the CCD of the digital camera of FIG. 2A, obtained in reflection from the reference mirror of the microscope objective and from the sample under test. The difference in the position of the two images is indicative of the sample's tilt.

The microscope's imaging leg 32, which is composed of the objective 20 and an imaging system 28, forms two images of the aperture on a CCD-camera 34, as shown in FIG. 2B. One image RI is formed in reflection off the mirror 26 and serves as a reference, while another image SI is produced in reflection off the sample 22.

Figure 2C:
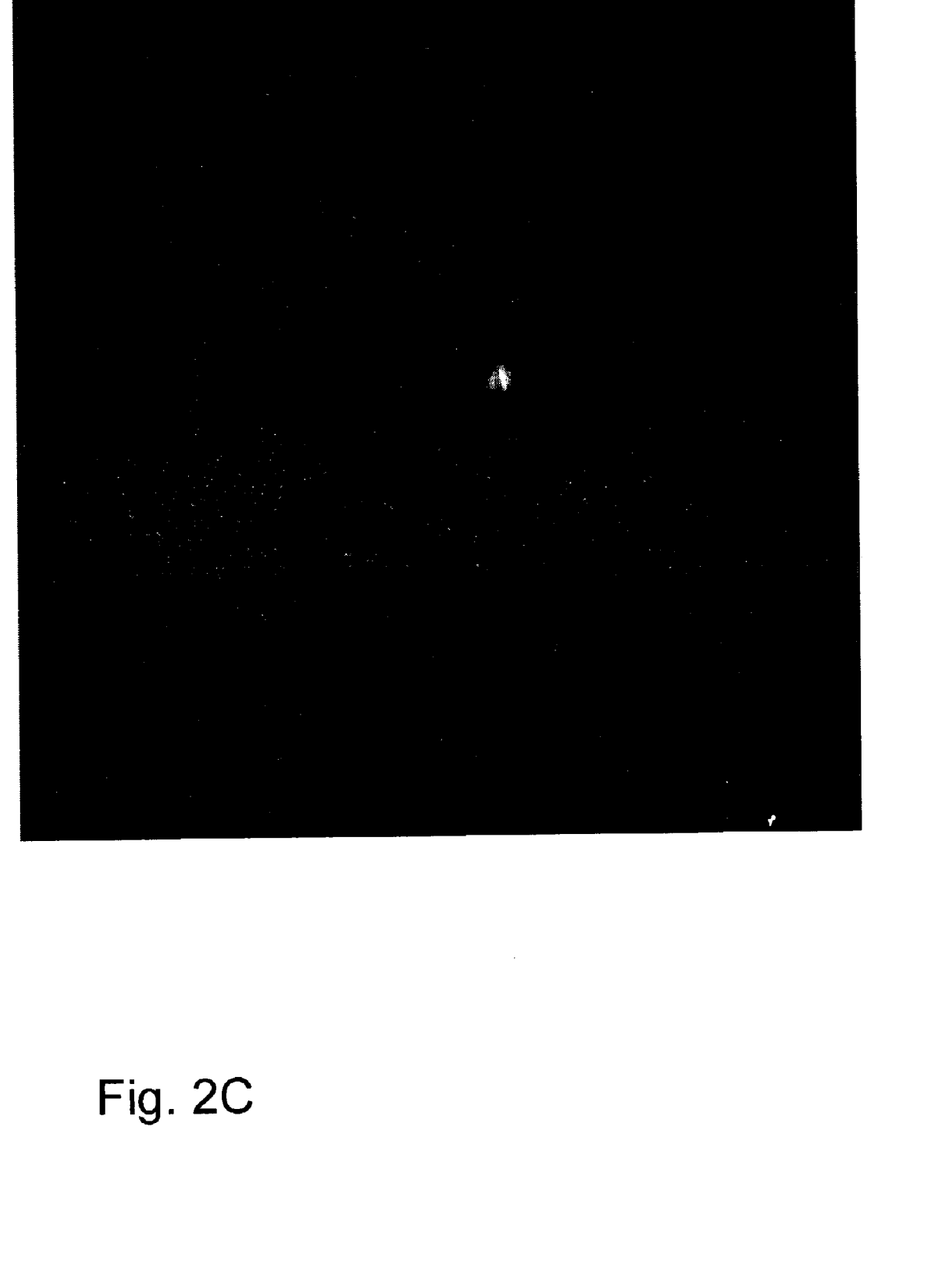
FIG. 2C shows a single spot at the CCD of the digital camera of FIG. 2A, which represents two coinciding images obtained in reflection from the reference mirror of the microscope objective and from the sample after tilt is corrected.

The spot image SI moves with changes in the sample tilt with respect to the mirror 26. A comparison between the so-called null position 9 (defined as the position of the reference image RI) and the position of the image SI using available software algorithms allows the required correction of the sample tilt, which is achieved when the two images RI,SI coincide in the detector plane of the CCD-camera, as shown in FIG. 2C.

Figure 2D:
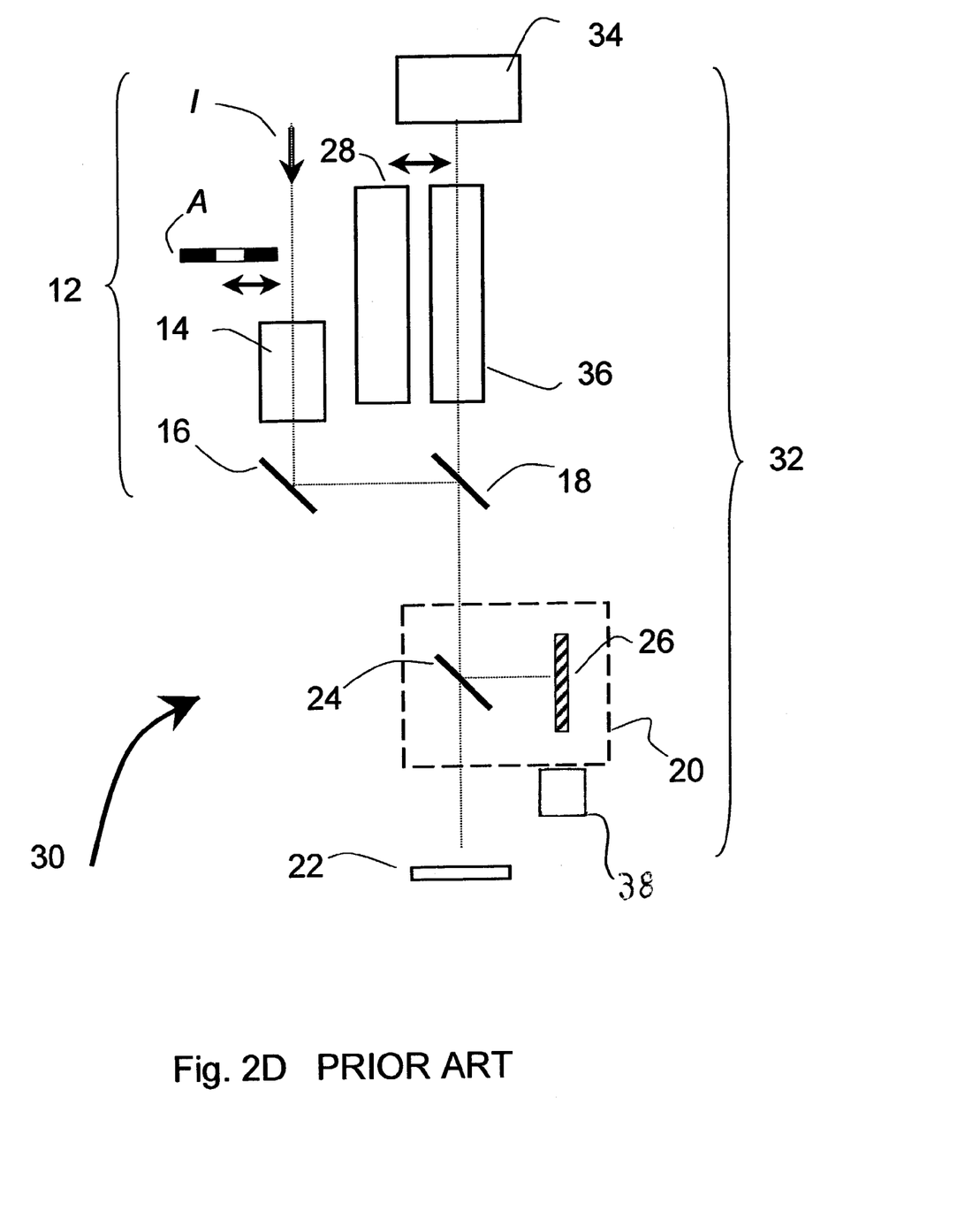
FIG. 2D is a schematic representation of the conventional interferometric microscope of FIG. 2A wherein the imaging optics in the metrology leg have been switched to perform surface characterization of the sample.

To perform a sample measurement under the illumination I, the aperture A is removed from the illumination leg 12 of the microscope, as shown in FIG. 2D, and the imaging system 28 in the metrology leg 32 is substituted by a conventional optical system 36 for imaging the sample surface onto the camera 34. A conventional scanner 38 is used for scanning interferometric measurements.

Figure 3:
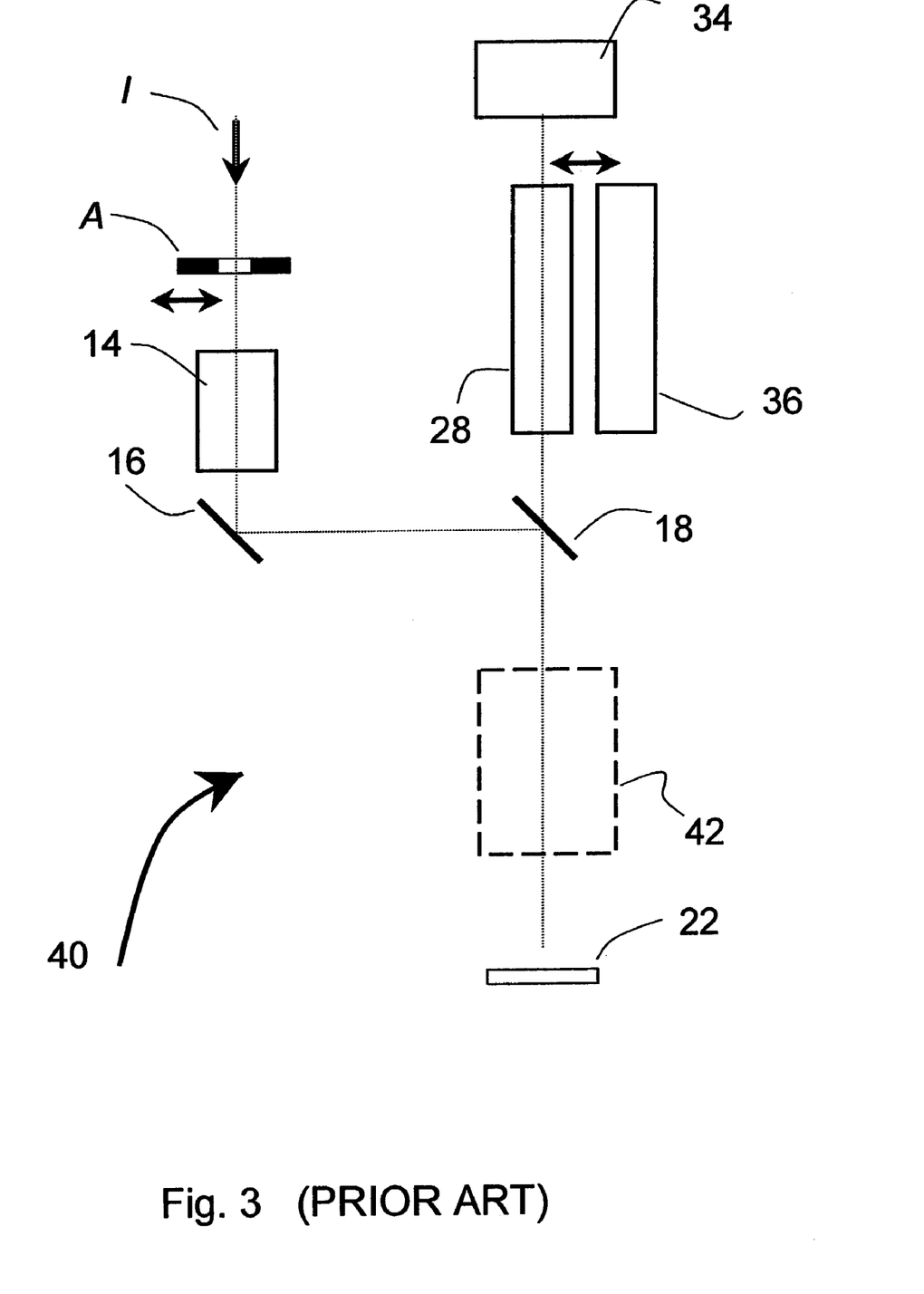
FIG. 3 illustrates a non-interferometric microscope configuration for tilt measurement of a sample.

The sample's tilt detection and correction in non-interferometric microscopes is implemented in a similar way. As illustrated in FIG. 3, the use of a non-interferometric objective 42 would result in only one image of the point light source being detected by the camera 34. This image originates on the sample 22, and changes its position with the sample's tilt. Thus, the use of a non-interferometric objective requires a pre-calibration of the null position, after which the sample's tilt is corrected by re-orienting the sample so that the image spot coincides with the calibrated null position, as would be clear to one skilled in the art.

Several aspects of prior-art tilt detection and correction limit the degree to which they can be utilized practically in an optical system. First, the position of the aperture in the illumination leg of the microscope system is critical. If the aperture is not returned to the very same spot between measurements of multiple samples, the tilt correction process in non-interferometric microscopes introduces inaccuracies due to changes in calibration settings. Further, tilt correction followed by sample measurement requires change of optical systems in the metrology leg of the microscope as well as flipping the aperture in an out of its illumination leg, which is time consuming and creates mechanical vibrations that reduce the measurement accuracy of the system. Finally, the light intensities required to perform sample tilt correction and sample measurement are often different, and needed adjustments in the light source consume extra time.

To the extent that tilt measurement precedes surface metrology, these drawbacks are unavoidable as long as a mechanical aperture and an additional optical system are introduced in the illumination and metrology legs of the microscope, respectively. Thus, there remains a need for a robust, high-speed and low mechanical-drift microscope system for correcting large tilts that overcomes the limitations described above.

SUMMARY OF THE INVENTION

This invention provides a novel optical arrangement for fast and reliable large tilt detection and correction in an optical microscope. The invention is in principal defined by the following modifications to conventional systems: (i) a supplementary light source and a separate camera are used respectively for sample illumination and tilt detection in the autocollimator, and (ii) the two movable optical systems currently used for tilt detection and sample characterization are substituted by a fixed optical set-up.

According to one aspect of the invention, the conventional movable point source aperture in the illumination leg of the microscope is replaced by a laser diode (or equivalently by an LED with a collimating lens) used as a dedicated reference point light source for tilt measurements. The laser diode is turned on only for the duration of the tilt measurement, when light is delivered to the optical system of the microscope without obstruction of the normal illumination path. The position of the laser diode is fixed. Thus, all mechanical vibrations that affect microscope performance due to the moving of the light source in and out of place in a conventional device are eliminated. An additional benefit with reference to non-interferometric microscopes is the fact that, due to the fixed location of the reference laser diode source, no time for re-calibration of the null position is required when performing multiple sample tests.

According to another aspect of the invention, the two switchable optical systems conventionally used in the metrology leg of the microscope to alternately perform tilt measurement and surface measurement are replaced by two permanently positioned independent imaging systems, each of which is dedicated to perform only one type of measurement. For each measurement, the light from the dedicated optical source is delivered to the appropriate imaging system. Such optical decoupling of the two types of measurement eliminates the prior-art need for switching lens systems, which enables shorter measurement cycles, reduces mechanical vibrations, and simplifies hardware control mechanisms.

According to yet another aspect of the invention, the use of two mutually non-obstructing light sources (the laser diode and the conventional illumination source) advantageously results in shorter measurement cycles because no adjustment of the light intensity is required between sequential measurements.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention is directed at providing an optical microscope system for high-speed tilt monitoring and measurement of a sample under test which overcomes the drawbacks of prior-art configurations. Specifically, the re-positioning of system components between the measurement of tilt and the surface characterization is eliminated, as well as the corresponding need for optical re-calibration. In addition, the optical hardware is configured for time-efficient measurements.

As those skilled in the art would readily recognize, the terms tip and tilt are used conventionally to refer to the angular misalignment of the sample with respect to a predetermined reference plane. For simplicity, only the term tilt is used in this disclosure, but it is understood that it refers to the two-dimensional correction required for proper alignment of the sample. As used and claimed herein, a point light source is defined as a source wherein the maximum dimension of the element emitting light, regardless of its shape, is significantly smaller (many orders of magnitude smaller) than any dimension of the various components of the optical system through which the light is propagated.

Figure 4A:
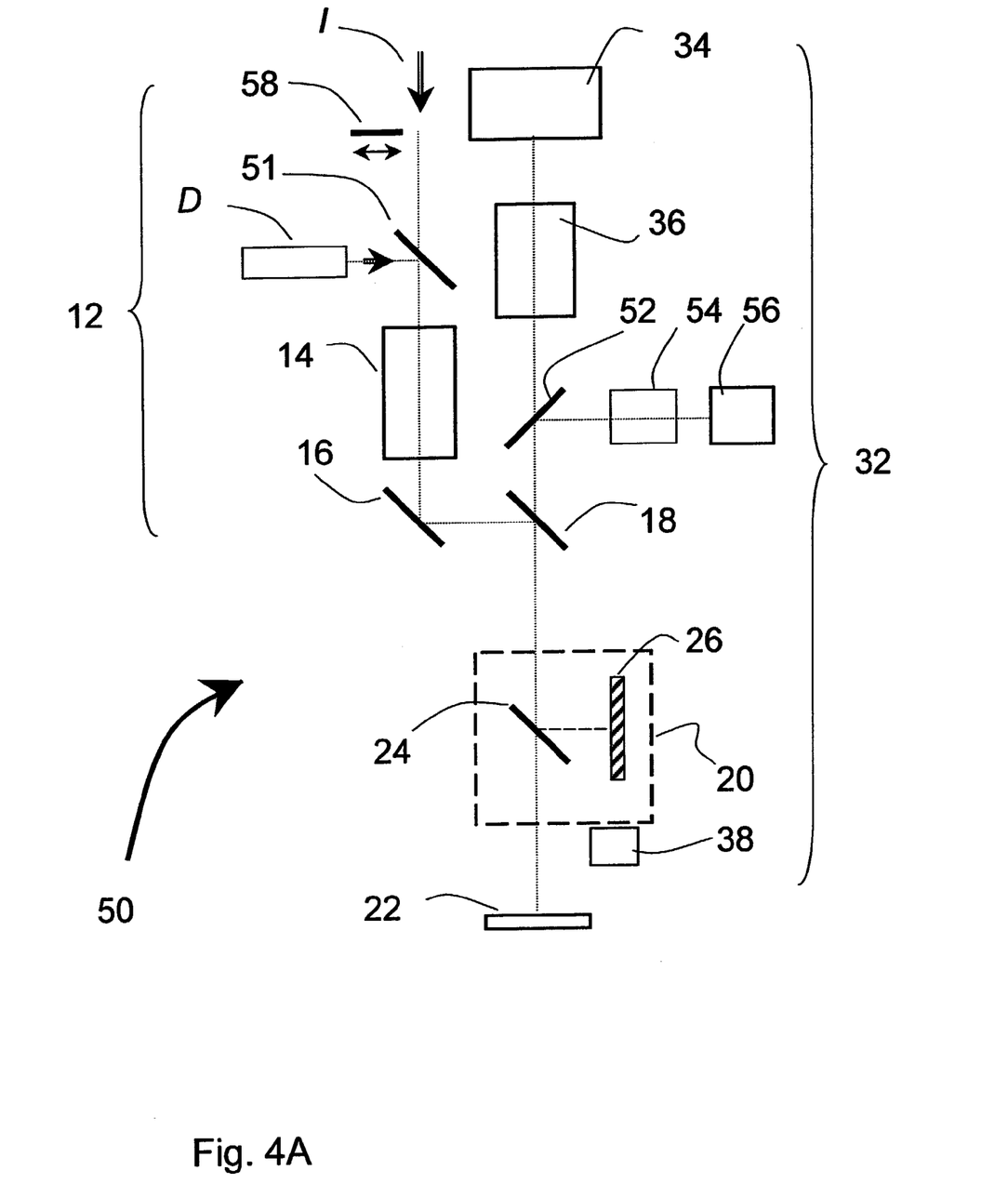
FIG. 4A is a schematic representation of an interferometric microscope of the invention with a dedicated point light source and imaging system for tilt detection and correction.
Figure 4B:
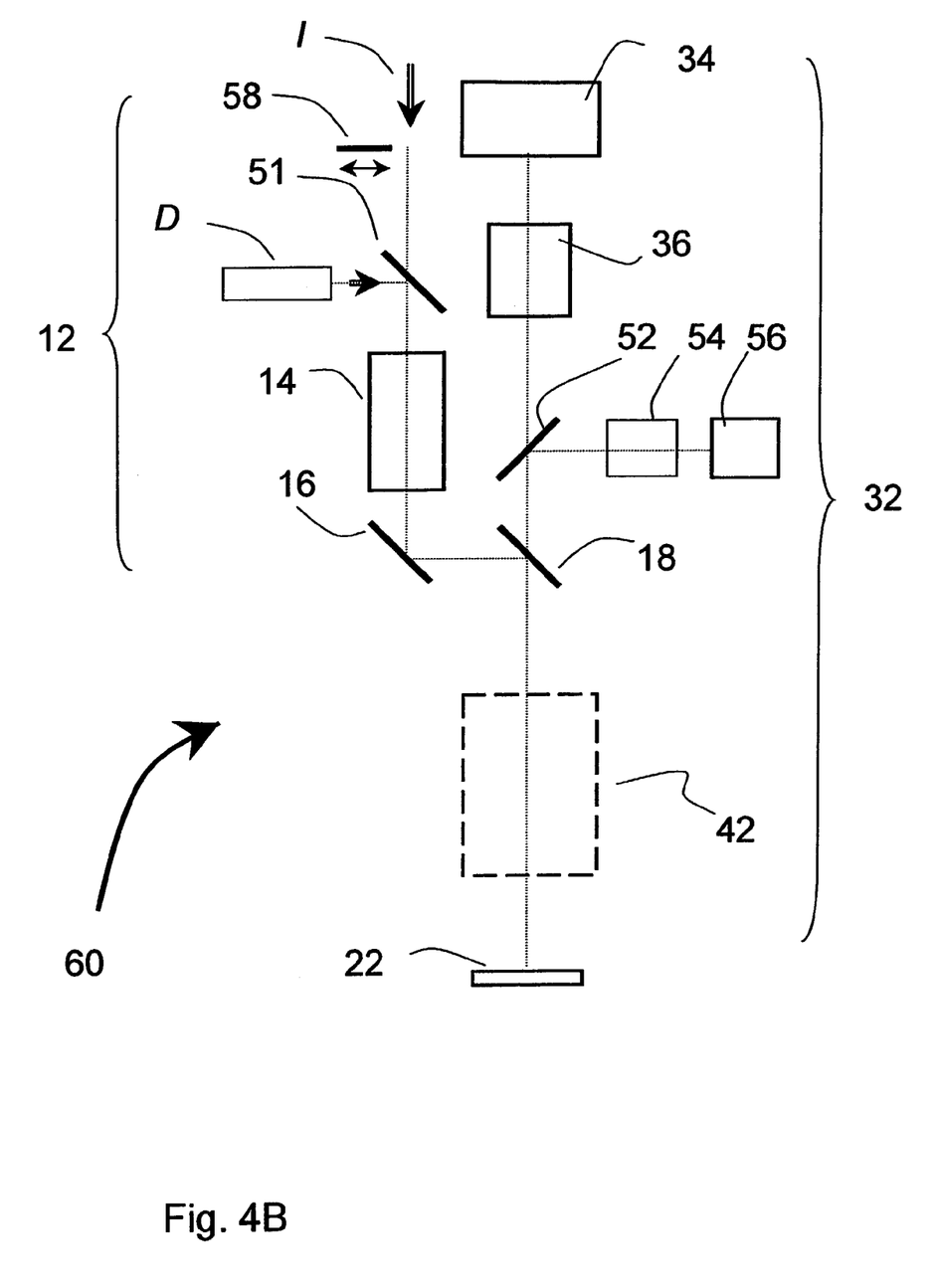
FIG. 4B is a schematic representation of a non-interferometric embodiment of the invention.

Referring to the figures, wherein like parts are designated with like numerals and letters, FIG. 4A schematically illustrates the optical train of an interferometric microscope 50 used in the embodiment of the invention for adjustment of a large tilt in a sample 22. The structure of the microscope 50 represents a modification of the conventional system 30 of FIG. 2A.

As illustrated in FIG. 4A, the preferred optical configuration consists of two subsets referred to as legs, an illumination leg 12 and a metrology leg 32. A source of light (not shown) is used to perform the sample metrology task using one of the many techniques adopted in the art such as, for example, vertical scan interferometry (VSI) or phase-shift interferometry (PSI). The source delivers light I into the illumination leg 12 of the microscope. The combination of an optical system 14 in the illumination leg, with a mirror 16, a beamsplitter 18 and an interferometric microscope objective 20 delivers the light to the surface of the sample 22.

The characterization of the sample's surface (i.e., the metrology function) is carried out in reflection by imaging it with the objective 20 and a conventional optical system 36 onto a CCD-camera 34. The optical layouts for systems 14 and 36 are traditional in microscopes and known to one skilled in the art.

To illuminate the sample for the detection and correction of its tilt according to the invention, an arrangement is chosen that does not perturb the existing optical systems 14,36. Specifically, a laser diode D and a beamsplitter 51 (with about 4 percent reflection in the preferred embodiment) are appropriately and permanently introduced into the illumination leg 12. Thus, the imaging of the laser diode's aperture, which acts as a point light source, onto the sample 22 is provided by normal optical means in autocollimating fashion. To detect the tilt of the sample, a permanent beamsplitter 52 (with about 14 percent reflection in the preferred embodiment) and additional optics 54 are made a part of the metrology leg 32, as compared to the prior-art structure of FIG. 2A. The optics 54 together with the existing optics 20,36 image the surface of the sample onto a supplementary camera 56, dedicated specifically to tilt measurements. As explained above, the tilt is referenced and corrected with respect to an image of the reference mirror 26, which is simultaneously obtained on the detector 56. This procedure was earlier described with reference to FIGS. 2A and 2D. The laser diode D is turned on only for the duration of the tilt measurement and correction.

During a typical tilt-correction cycle, a sample in a tray is placed on the positioning stage (not shown) under the objective of the interferometric microscope 50, and the laser diode D is turned on. All adjustments in the system as well as the data processing and feedback are computerized. Typically, the working distance between the objective and the sample does not need adjustment for the images SI,RI of the laser-diode facet—one in reflection off the sample 22 and the other in reflection off the reference mirror 26—to be obtained in acceptable focus on the detector of the dedicated camera 56. This situation is depicted in FIG. 2B. Such imaging is preferably carried out using a light source D with a very narrow spectral band (which is visible in the preferred embodiment of the invention). In addition, any optical noise can easily be cancelled by subtracting optical signals outside of the spectral window of interest using, for example, optical filtering at camera 56. In the preferred embodiment of the invention, the illuminating light I is merely blocked with a mechanical shutter 58 for the duration of the tilt correction cycle. It is clear, nonetheless, that this step is not required because the color of the source D allows visibility and automated identification of the images RI,SI even when the light I is not blocked. Just as in prior-art systems, the tilt of the sample is compensated by adjusting its two-dimensional angular position until the best possible overlap is achieved between the two images on camera 56, as shown in FIG. 2C.

All tilt correction software algorithms remain the same as in the prior-art embodiment. However, since the reference image position (null-position) defined by the fixed laser diode is permanent, the implementation of the process takes less than one second, as compared to several seconds in corresponding prior-art systems.

After the sample tilt has been corrected, the laser source is turned off, and the required surface characterization is performed under the illumination I. To perform such a characterization, the working distance between the objective and the sample is adjusted again to appropriately image its surface on camera 34 through the optics of the metrology leg 32.

Thus, as compared to the conventional optical system of the microscope 30 of FIG. 2A, the three movable opto-mechanical subsystems (A, 28 and 36) are substituted with fixed optical elements. An inexpensive light source D and a beamsplitter 51 replace, in permanent fixed position, the switchable aperture A in the illumination leg 12 of the invention. Similarly, the beamsplitter 52, the optics 54 and the camera 56 replace the switchable set of optical systems 28,36. All opto-mechanical components of the system 50 are permanently positioned during both tilt detection and correction, and during surface characterization measurements. This eliminates all mechanical movements and the vibrations associated with optics replacement, and it speeds up the conventional measurement cycle.

In addition, with reference to non-interferometric applications, the replacement of the movable aperture A with a laser diode D eliminates the need for re-calibration of the null-position of the sample under test. This, in turn, improves the accuracy of the measurement algorithm.

Moreover, the use of two independent light sources and two autonomous detection cameras 34,56 accommodates the need for different light intensities required for tilt detection and surface characterization. This saves measurement cycle time on light level adjustment, which is required in prior-art systems.

While the invention has been shown and described in what is believed to be the most practical and preferred embodiments, it is recognized that appropriate deviations can be made within the scope of the disclosure. Therefore, the invention is not to be limited to the disclosed details, but is intended to embrace all equivalent structures and methods.

What is claimed is:

1. A microscope device with a tilt adjustment for a test surface, comprising:
   a microscope objective;
   a surface-measurement light source illuminating the test surface through the microscope objective;
   surface-measurement optics for imaging the test surface onto a measurement light detector;
   a point light source directed to the test surface;
   a tilt-adjustment light detector for providing a test point image of said point light source on reflection from the test surface;
   means for adjusting a tilt of the test surface so as to cause said test point image on the tilt-adjustment light detector to coincide substantially with a predetermined null position; and
   a reference mirror and a scanning mechanism for interferometric measurements;
   wherein said point light source is separate from and independent of the surface-measurement light source, and said tilt-adjustment light detector is separate from and independent of the measurement light detector.

2. The device of claim 1, further including means for providing a reference point image of said point light source on said tilt-adjustment light detector on reflection from the reference mirror; and wherein said means for adjusting a tilt of the test surface is operable to cause said test point image to coincide substantially with said reference point image.

3. The device of claim 2, further including tilt-adjustment optics for imaging said test point image on the tilt-adjustment light detector, and a beamsplitter within the surface-measurement optics for reflecting said point light source on reflection from the test surface toward the tilt-adjustment optics.

4. The device of claim 3, further including a shutter to optionally block said surface-measurement light source.

5. The device of claim 1, wherein said microscope objective includes the reference mirror and is coupled to the scanning mechanism for interferometric measurements.

6. The device of claim 1, further including tilt-adjustment optics for imaging said test point image on the tilt-adjustment light detector, and a beamsplitter within the surface-measurement optics for reflecting said point light source on reflection from the test surface toward the tilt-adjustment optics.

7. The device of claim 1, further including a shutter to optionally block said surface-measurement light source.

8. A method for adjusting the tilt of a test surface in a device that includes a microscope objective, a surface-measurement light source illuminating the test surface through the microscope objective, and surface-measurement optics for imaging the test surface onto a measurement light detector, the method comprising the following steps:
   (a) providing a point light source directed to the test surface;

(b) providing a tilt-adjustment light detector for receiving a test point image of the point light source on reflection from the test surface;

(c) adjusting a tilt of the test surface so as to cause said test point image on the tilt-adjustment light detector to coincide substantially with a predetermined null position; and (d) providing a reference mirror and a scanning mechanism for interferometric measurements, wherein said point light source is separate from and independent of the surface-measurement light source, and said tilt-adjustment light detector is separate from and independent of the measurement light detector.

9. The method of claim 8, further including the step of providing a reference point image of said point light source on said tilt-adjustment light detector on reflection from the reference mirror, and the step of operating said means for adjusting a tilt of the test surface so as to cause said test point image to coincide substantially with said reference point image.

10. The method of claim 9, further including the step of providing tilt-adjustment optics for imaging said test point image on the tilt-adjustment light detector, and a beamsplitter within the surface-measurement optics for reflecting said point light source on reflection from the test surface toward the tilt-adjustment optics.

11. The method of claim 10, further including the step of blocking said surface-measurement light source during said step (c).

12. The method of claim 8, wherein said microscope objective includes the reference mirror and is coupled to the scanning mechanism for interferometric measurements.

13. The method of claim 8, further including the step of providing tilt-adjustment optics for imaging said test point image on the tilt-adjustment light detector, and a beamsplitter within the surface-measurement optics for reflecting said point light source on reflection from the test surface toward the tilt-adjustment optics.

14. The method of claim 8, further including the step of blocking said surface-measurement light source during said step (c).

* * * * *